United States Patent [19]

Yamaguchi et al.

[11] Patent Number: 4,876,567

[45] Date of Patent: Oct. 24, 1989

[54] CRT PRINTING METHOD AND APPARATUS FOR MAKING A PRINT OF AN IMAGE WITH LETTERS

[75] Inventors: Kiyoshi Yamaguchi; Azuchi Endo; Kiichiro Sakamoto, all of Kanagawa, Japan

[73] Assignee: Fuji Photo Film Co., Ltd., Kanagawa, Japan

[21] Appl. No.: 29,921

[22] Filed: Mar. 25, 1987

[30] Foreign Application Priority Data

Mar. 25, 1986 [JP] Japan ................................. 61-64895
Mar. 25, 1986 [JP] Japan ................................. 61-64896
Apr. 1, 1986 [JP] Japan ................................. 61-72424
Apr. 1, 1986 [JP] Japan ................................. 61-72425
Apr. 1, 1986 [JP] Japan ................................. 61-72426
Apr. 1, 1986 [JP] Japan ................................. 61-72427

[51] Int. Cl.$^4$ ............................................. E03B 27/52
[52] U.S. Cl. ............................................ 355/20; 355/39; 355/45; 355/77
[58] Field of Search ................ 354/76, 77, 80; 355/19, 355/20, 39, 40, 32, 77, 43, 44, 45; 358/78, 244, 302, 332, 345, 244.1, 244.2

[56] References Cited

U.S. PATENT DOCUMENTS

| | | | |
|---|---|---|---|
| 3,724,347 | 4/1973 | Gerber | 354/77 |
| 4,453,822 | 6/1984 | Lewis | 354/77 |
| 4,462,045 | 7/1984 | Norris | 358/244 |
| 4,786,944 | 11/1988 | Sakamoto | 355/20 |

Primary Examiner—L. T. Hix
Assistant Examiner—David M. Gray
Attorney, Agent, or Firm—Sughrue, Mion, Zinn, Macpeak & Seas

[57] ABSTRACT

A CRT printing method and apparatus for making a print of an image with letters in order to provide, for example, a picture card with a season's complimentary phrase or message comprising a CRT display device for displaying an image on its screen, a letter bearing member with a complimentary phrase provided thereon which is disposed on or close to the CRT screen, and an exposure system for exposing a photographic paper to the CRT image and the letter bearing member. The letter bearing member is disposed, through a diffusing plate, on desired area of the CRT screen. Part of the CRT image is erased and the corresponding area of the screen is caused to emit light for illuminating the letter bearing member.

21 Claims, 8 Drawing Sheets

CRT PRINTING METHOD AND APPARATUS FOR MAKING A PRINT OF AN IMAGE WITH LETTERS

BACKGROUND OF INVENTION

The present invention relates to a CRT printing method and apparatus for making a print of a photographic scene with letters.

In recent years, there has been widespread use of various kinds of photographic prints of a scene with a season's greeting or complimentary phrase which are often used as postcards, greeting cards and the like. For making the prints, a CRT printing apparatus is heretofore used which is adapted to display on the screen of a CRT display device a scene image and a season's complimentary phrase as a composite image to which a photographic paper is exposed. The composite image is prepared by processing images of the scene from an image input device such as color TV cameras and the season's complimentary phrase graphically provided through a keyboard. For this image processing, the images are treated as video signals and processed with the aid of a computer.

Alternatively, there is also used a letter image printing unit comprising an illumination source and a lettered plate. This unit is adapted to be disposed in front of the CRT display device in such a way that the lettered plate is placed in contact with the photographic paper, thereby to print the image of the letters on the photographic paper in contact printing simultaneous with the CRT image.

In any case, there is an essential requirement for these prints, that letters to be printed as a complimentary phrase on a photographic paper must be sharply outlined rather than degraded in image quality. This requirement is not fulfilled by the conventional CRT printing apparatus because the image of letter displayed on the CRT screen is unclear in outline. In addition to the lack of sharpness, the letters printed black are overlapped with transverse bright lines which result from rasters appearing on the CRT screen, thus degrading image quality.

Another problem with which the conventional CRT printing apparatus is that the color of letters to be printed depends on color filters used to print a color image from the CRT. Due to this dependency on the color filters, it is hard to print the desired color of letters on a color photographic paper.

Still another problem, in particular, of the letter printing unit is the necessity of an extra illumination source to illuminate the lettered plate. This necessity makes the unit complicated in construction and difficult to manufacture at a low cost.

OBJECTS OF THE INVENTION

It is, therefore, an object of the present invention to provide a CRT printing method and apparatus for making a print of an image, including letters with a good image quality in an easy operation.

It is another object of the present invention to provide a CRT printing method and apparatus for making a print of an image, including letters in which various complementary phases can be selectively printed.

It is a further object of the present invention to provide a CRT printing method and apparatus for making a print of an image, which can print letters with a desired color.

SUMMARY OF THE INVENTION

To achieve the above and other objects and advantages of the present invention, the CRT printing method and apparatus comprises means for displaying an image on the screen of a CRT display device, letter bearing means provided with at least one complimentary phrase thereon which is removable placed on or close to the screen of the CRT display device, and means for exposing a photographic paper to the CRT image on the CRT screen and the complimentary phrase on the letter bearing means.

According to a first feature of the present invention the CRT image displaying means includes an image memory wherein image data of the image to be printed is stored and is partially replaced with illumination data so as to erase part of the CRT image on an area of the CRT screen where the letter bearing means is disposed. According to the illumination data the area of the CRT screen is caused to emit light so as to illuminate the letter bearing means to which the photographic paper is exposed. In order to prevent rasters appearing in the illumination area of the screen from being printed such to degrade the image quality of the complimentary phrase on the photographic paper, there is a diffusion plate through which the letter bearing means is placed on or close to the CRT screen. The letter bearing means may be placed at any position on the CRT screen so as to allow printing of the message in a vertical or horizontal orientation, at the bottom or the top of the photographic paper.

According to another feature of the present invention, the printing CRT comprises a black-and-white CRT display device which is adapted to display three separate monochromatic images which correspond to the separate color components of the image to be printed, namely blue, green and red. The brightness of the corresponding black-and-white images is selectively varied, and then the photographic paper is actually exposed in sequence through blue, green and red color filters in a multiple exposure. In this case, the illumination data includes data corresponding to the blue, green and red color components of illumination light so as to print a complimentary phrase of the desired color on the photographic paper.

BRIEF DESCRIPTION OF THE DRAWINGS

These and other objects and features of the present invention will become apparent form the following description taken in conjunction with the preferred embodiments thereof, with reference to the accompanying drawings, in which.

DETAILED DESCRIPTION OF THE INVENTION

Before the description of the present invention proceeds, it is to be noted that same or similar parts are designated by the same references numerals throughout the views of the accompanying drawings.

Figure 1:
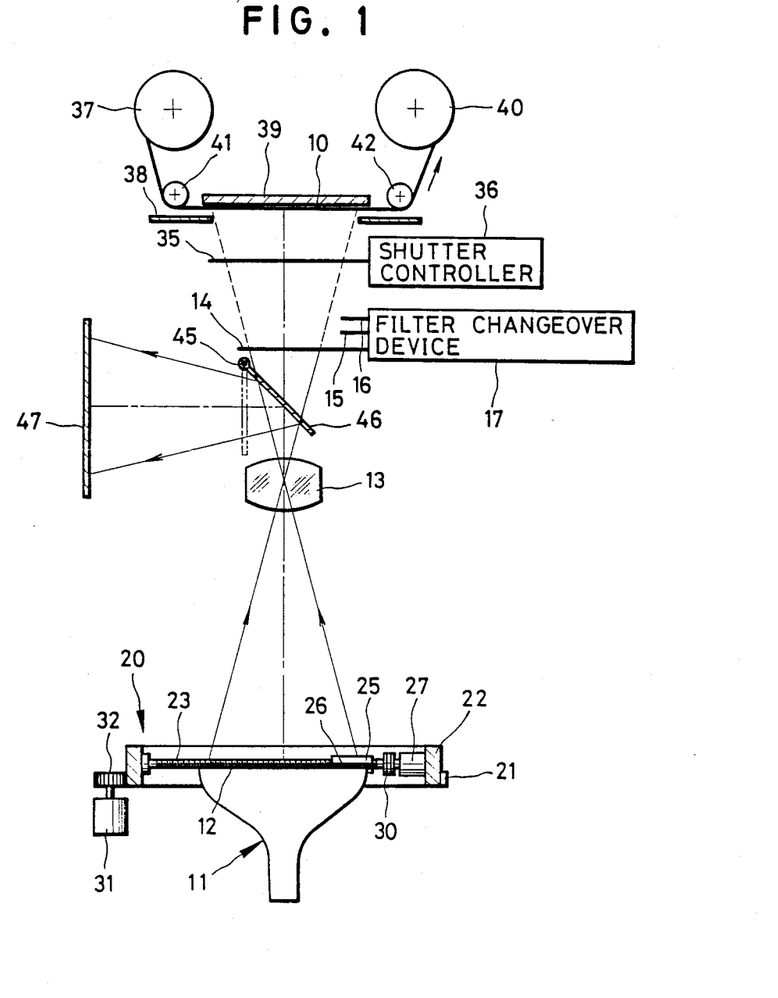
FIG. 1 is schematic illustration of the CRT printing apparatus embodying the present invention.

Referring now to the drawings and, in particular, to FIG. 1, there is shown a specific embodiment of the CRT image printing apparatus according to the present invention which is used to make a print of a CRT image with letters such as season's greetings or complimentary phrases. The CRT image printing apparatus has a black-and-white CRT display device (which is referred to as a CRT for simplicity) 11 disposed opposite to a color photographic paper 10 relative to a printing lens 13. The CRT 11 displays on the screen 12 thereof an image of an original to be printed. The image displayed on the screen 12 is, in this specification, referred to as a CRT image. The CRT 11 sequentially displays on the screen 12 thereof black-and-white images in the form of a brightness pattern for three monochromatic images; namely, blue green and red images, of the original to be printed. The color photographic paper 10 is exposed sequentially to the monochromatic images on the screen 12 of the CRT 11 through the printing lens 13 when a shutter 35 is opened. During this exposure, three primary color filters 14 to 16, namely red, green and blue filters, are selectively sequentially inserted between the printing lens 13 and the shutter 35 under the control of a filter changeover device 17 so as to create monochromatic CRT images to which the color photographic paper 10 is actually exposed in sequence. In this way, the color photographic paper 10 is sequentially exposed to three monochromatic images, namely red, green and blue images, in this order. For the printing lens 13, although it is preferred to use a zoom lens, it is nevertheless permissible to selectively use one of a plurality of printing lenses having a different focal lengths which are mounted on a revolving plate.

On postcards or greeting cards there is often desired to have the compliments of seasons such as "A HAPPY NEW YEAR". "A MERRY CHRISTMAS" and the like printed either at the top or at the bottom or on the side thereof. For printing the season's greeting or complimentary phrases on the color photographic paper 10, a letter display unit 20 is mounted on the CRT 11. As is shown in detail in FIG. 2, the letter display unit 20 has a rotatable annual ring 22 formed with threads or gear teeth 21 on the outer periphery thereof. Inside the annular ring 22 are a screw rod 23 rotably mounted and a guide rod 24 which are parallel with each other and between which a carrier 25 is supported for rectilinear movement so as to locate a lettered plate 26 held thereon at any desired position on the screen 12. Preferably, the carrier 25 is of a transparent plastic plate and holds the lettered plate 26 either put thereon or removably adhered thereto. Alternatively, the carrier 25 may be opaque. In this case, the carrier 25 is formed with an opening wherein the lettered plate 26 is removably secured. At one end of the screw rod 23 is a pulley 28 which is rotably coupled to a pulley 29 at the output shaft of a motor 27 with a belt 30.

Figure 2:
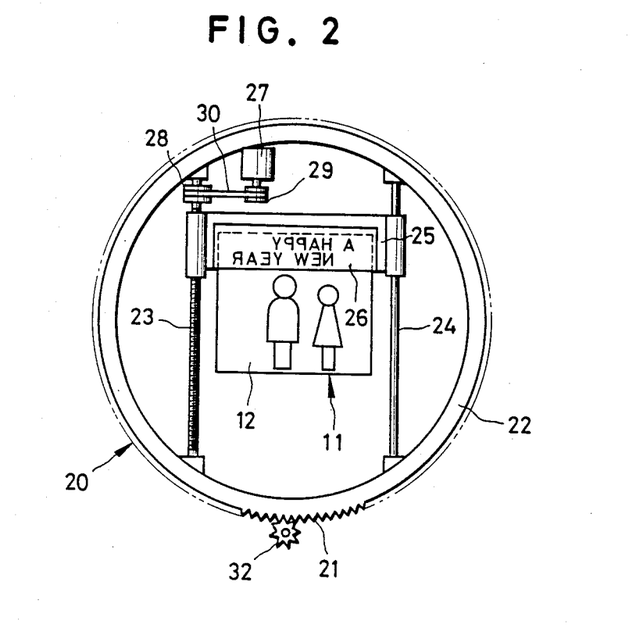
FIG. 2 is a plan view of a letter display unit used in the CRT printing apparatus of FIG. 1.

In order to allow printing of the season's greeting or complimentary phrases on the color photographic paper 10 either in vertical or horizontal orientation, a pinion gear 32 driven by a motor 31 meshes with the threads 21 of the annular ring 22 so as to rotate the annular ring 22 through at least a right angle. The motor 31 can be replaced with a manually operable knob.

The lettered plate 26 can be easily prepared by printing an original with a season's greeting or complimentary phrases on a lithographic negative film. When using an original with a black-letter complimentary phrase on a white back ground, the complimentary phrase is transparent on a dark back ground on the photographic paper. When, on the other hand, using an original with a transparent-letter complimentary phrase on a dark back ground, a dark-letter complimentary phrase is formed on a bright back ground on the photographic paper. In the case of printing a colored complimentary phrase on the color photographic paper 10, a lithographic negative film with the transparent-letter of complimentary phrase is used and illuminated with light whose three color components are regulated suitably for a desired color. It is permissible to use, in place of the lithographic negative film, either a transparent plastic plate with a complimentary phrase printed thereon or an opaque plastic plate made like a stencil.

The lettered plate 26 is illuminated with light from part of the CRT screen 12 where the lettered plate is placed. In this sense, part of the CRT screen is, in this specification, referred to as an illumination area. In order to prevent rasters in the illumination area from being printed as transverse lines on the color photographic paper where a complimentary phrase is to be printed, it is desired to provide a lettered plate attached with a diffusing plate there under or to use a carrier made of materials having a diffusion property on which the lettered plate is held. Although the complimentary phrase on the lettered plate 26 is usually printed on the color photographic paper 10 simultaneously with the CRT image on the screen 12, nevertheless the complimentary phrase may be printed on the color photographic paper 10 independently from the printing of the CRT image. This is performed by physically or electrically masking the illumination area so as to disable the non-printing area from emitting light.

The shutter 35 disposed between the color photographic paper 10 and the CRT display device is controlled by a shutter controller 36 to open and close once for every monochromatic image, namely three times in total, so as to form latent images of the three monochromatic CRT images. If the CRT image is allowed to be displayed in a relatively low resolution, color CRT display devices can be used. The usage of the color CRT display device makes it possible to print a color CRT image on the color photographic paper 10 by a single opening and closing operation of the shutter 35.

When the exposure of the color photographic paper 10 is completed in three color frame sequence exposure system, additional color photographic paper 10 is withdrawn from a paper supply reel 37 and advanced by one from such that an unexposed part is positioned between an exposure mask 38 and a pressure plate 39. The exposed part of the color photographic paper 10 is wound up on a take-up reel 40. During the one-frame advancement the color photographic paper 10 is guided by a pair of rollers 41 and 42.

If the CRT image exists partially in the illumination area of the CRT screen 12, data of the overlapping part of the CRT image in a frame memory 53 is replaced with data of illumination according to the color of letters to be printed. Based on this illumination data the CRT 11 is driven to emit light. Specifically, when it is wanted to print a cyan-colored complimentary phrase on the color photographic paper 10 from the lettered plate 26 with, for example, transparent letters, it is enough to expose the color photographic paper 10 to the lettered plate 26 through the red filter 14 upon the exposure of a red CRT image. In the same way, a magenta-colored complimentary phrase and a yellow-colored complimentary phrase can be printed as a result of the exposure of a green and blue CRT image, respectively. If the color photographic paper 10 is exposed to the lettered plate 26 all the times that it is exposed to the three monochromatic CRT images, a black letter image will be printed on the color photographic paper 10. In this case, a desired color of complimentary phrase can be formed on the color photographic paper 10 by regulating the three primary color components of illumination light.

Above the printing lens 13 is a mirror 46 mounted on a shaft 45 for pivotal movement. The mirror 46 is pivotally moved into the optical path of the printing lens 13 and inclined at a certain angle upon monitoring the CRT image and complimentary phrase to be printed, thereby to project the images on a transmitting type screen 47. When actually printing, the mirror 46 is returned to a position shown by a double-dotted line shown in FIG. 1.

Figure 3:
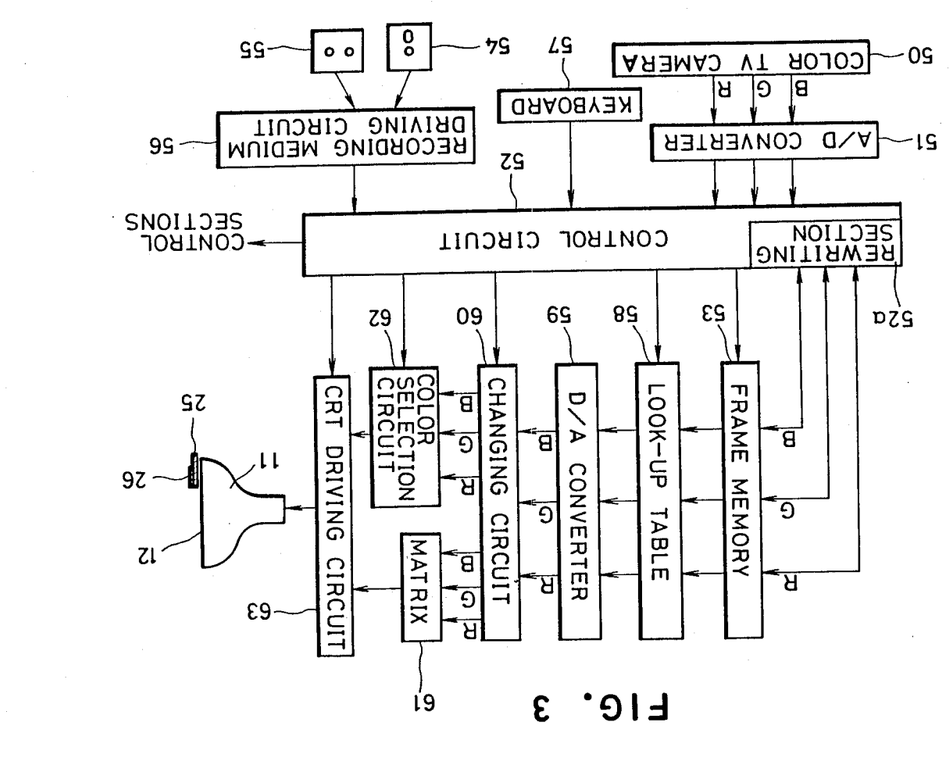
FIG. 3 is a block diagram showing a CRT control circuit which is a part of the CRT printing apparatus of the present invention.
Figure 4:
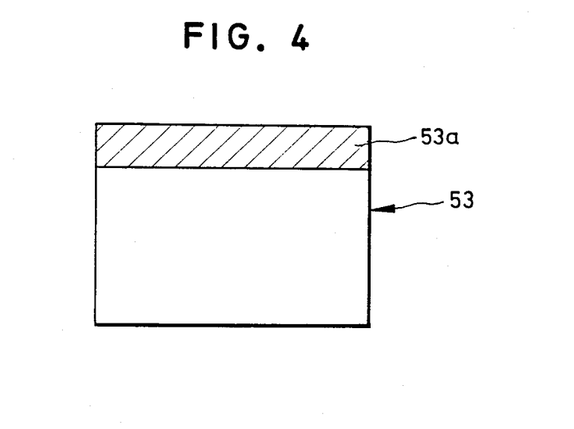
FIG. 4 is a conceptional illustration of a frame memory of the CRT control circuit of FIG. 3.

Referring now to FIG. 3, there is shown a circuit in the form of a block diagram for the CRT image exposure system. As an image input device, a TV camera 50 well known in the art per se can be used to enter an image to be displayed on the CRT screen 12 into the circuit. The color TV camera 50 can pick up the image in a three color separation system to provide analog image signals of the three color images, namely red, green and blue images, to A/D converter 51. The image signals of each monochromatic image, after having been converted into digital form, are transmitted to a control circuit 52 wherein the signals are logarithmically transformed and subjected to a color correction, and then stored as image signals in the frame memory 53 separately by color.

There is graphic image input means comprising a recording medium such as a floppy disk 54 or a magnetic tape 55, and a recording medium driving circuit 56. Through the recording medium driving circuit 56 computer graphic images (which are hereinafter referred to as CG images) and the like recorded on the floppy disk 54 or the magnetic tape 55 are read out and input into the control circuit 52. Alternatively, CG images may be input by the aid of a digitizer. There is also a keyboard 57 through which instructions are entered not only to control associated various sections but also to vary the illumination area in location, size and color. The CRT image can be also displayed in a different locations by storing image signals thereof in a different spaces of the frame memory 53. In the control circuit 52 the images from the color TV camera 50 and the floppy disk 54 or the magnetic tape 55 are electrically composed by adding their image signals by picture element.

The image signals for each color, when monitoring or printing the CRT image, are retrieved from the frame memory 53 and transmitted to a look-up table 58 so as to be corrected in gradation in accordance with the characteristic of the color photographic paper 10 and be subjected to a positive-negative reversal processing. It should be noted that no reversal processing is necessary to be conducted in the case of using a color reversal photographic paper.

The image signals from the look-up table 58 are again converted by D/A converter 59 into analog video signals which in turn are transmitted through a changing circuit 60 either to a matrix circuit 61 upon monitoring the positively reversed image or a color selection circuit 62 upon printing. In the matrix circuit 61 brightness signals are calculated based on the video signals of each monochromatic image and directed toward CRT driving circuit 63. On the other hand, the color selection circuit 62 is adapted to supply to the CRT driving circuit 63 the video signals in color sequence.

In order to partially erase the CRT image in the illumination area of the CRT screen 12, there is a rewriting section 52a in the control circuit 52 which is adapted to write the illumination data in the frame memory 53 in place of the data of the image which is the above-mentioned part of the CRT image to be eliminated. This rewriting of image data is performed by entering instructions as to the location of the illumination area and color through the keyboard 57. If color instruction for a single color is entered, a monochromatic complimentary phrase is printed. If it is required to print a composite color complimentary phrase, instructions for three colors are entered so as to regulate the three color components of illumination light in accordance with the required composite color.

A further understanding of the method of making prints of an image including letters and the apparatus embodying the method will be had from the following description referring to FIGS. 1 to 4.

Images input from the color TV camera 50 and CG images input from the floppy disk 54 or the magnetic tape 55 are electrically processed properly in the control circuit 52 and stored in the frame memory 53 separately by color. In the case of a plurality of images input simultaneously, these images are composed as composite images in the control circuit 52. These image input and image composing operations are performed while images on the monitor screen 47 are observed. During the observation, the changing circuit 60 selects the matrix circuit 61. A positive image stored in the frame memory in the form of an image signal is, after having been reversed from positive to negative and corrected in gradation in the look-up table, converted into analog signals by D/A converter 59. Through the changing circuit 60, the analog signals are transmitted to the matrix circuit 61. As is previously described, the matrix circuit 61 provides brightness signals based on the analog signals to the CRT driving circuit 63 to display a black-and-white image on the screen 12 of the CRT 11. At this time the mirror 46 is positioned in the optical path of the printing lens 13 to project the CRT image onto the screen 47.

When compositely printing the CRT image and the compliments, for example "A HAPPY NEW YEAR" on the color photographic paper 10, the lettered plate 26 on which the compliments is provided is put on the carrier 25. Positional instructions are entered through the keyboard so as to move the carrier 25 to a desired position on the CRT screen 12. Specifically according to the positional instructions, the motor 27 rotates so as to turn the screw rod 23 through the belt 30, causing the carrier 25 holding the lettered plate 26 thereon to move along the guide rod 24. On the other hand, printing line can be changed between a vertical and horizontal orientation by entering printing line instructions through the keyboard 57. According to the printing line instruction, the motor 31 rotates so as to turn the annular ring 22 through an angle of 90°.

The CRT image and the compliments are compositely projected onto the screen 47 so as to be subjected to an eye inspection to determine whether the composite image is properly provided. If in fact there is an improper composite image on the screen 47, the positions of the CRT image and/or the lettered plate 26 are independently rearranged to adjust the projected image observed on the screen 47. This rearrangement is performed by entering instructions through the keyboard 47. During the eye inspection, it is desirable to maintain the CRT at a low light emission level for prolonging the life of the CRT 11.

Instructions are entered through the keyboard 47 into the rewriting section 52a of the control circuit 52 to indicate the particular space of the screen 12 for the illumination area and a desired color with which letters are printed. As a result, image signals previously stored in memory cells of the space 53a of the frame memory 53 shaded in FIG. 4 which correspond to the desired illumination area on the screen 12, are replaced with color data. According to the color data, the CRT 11 is controlled so that the illumination area emits light suitable for printing letters with the desired color.

After the eye inspection of the composite image on the screen 47, instructions are entered through the keyboard 47 to start an actual printing of the composite image. As a result, the mirror 46 is removed from the optical path, the changing circuit 60 selects the selection circuit 62 to transmit the image signals thereto. At this time the CRT 11 is caused to produce its rated emission. The control circuit 52 controls and executes the multiple exposure of the color photographic paper 10 to the CRT image and the letter image. Specifically, the selection circuit 62 at first transmits the red color image signals to the CRT driving circuit 63 so as to display on the CRT screen 12 a black-and-white image of the red color image in the form of a brightness pattern. During the display of the red color image on the CRT screen 12, the filter changeover device 17 moves the red filter 14 into the optical path of the printing lens 13. The red filter 14 changes the black-and-white image projected by the printing lens 13 to its corresponding red image to which the color photographic paper 10 can be exposed. The shutter 35 is then opened under the control of the shutter controller 36 for a predetermined duration of time, for example one second, which is determined according to the sensitivity of the color photographic paper 10 to red light. This allows the color photographic paper 10 to be exposed to the red composite image projected by the printing lens 13.

After the duration of time, the shutter 35 is closed and the red filter 14 is replaced with the green filter 15. Simultaneously, the selection circuit 62 transmits the green color image signals to the CRT driving circuit 63 so as to display on the CRT screen 12 a black-and-white image in the form of a brightness pattern. The shutter 35 is again opened for a predetermined duration of time, for example one second, allowing the color photographic paper 10 to be exposed to the green composite image. The exposure of the color photographic paper 10 to the blue composite image is made in the same manner as described above. When the color photographic paper 10 is exposed to the red, green and blue images in such the three color frame sequence method as described above, additional color photographic paper 10 is withdrawn from the supply reel 37 and the exposed part thereof is wound up by the take-up reel 40.

Figure 5:
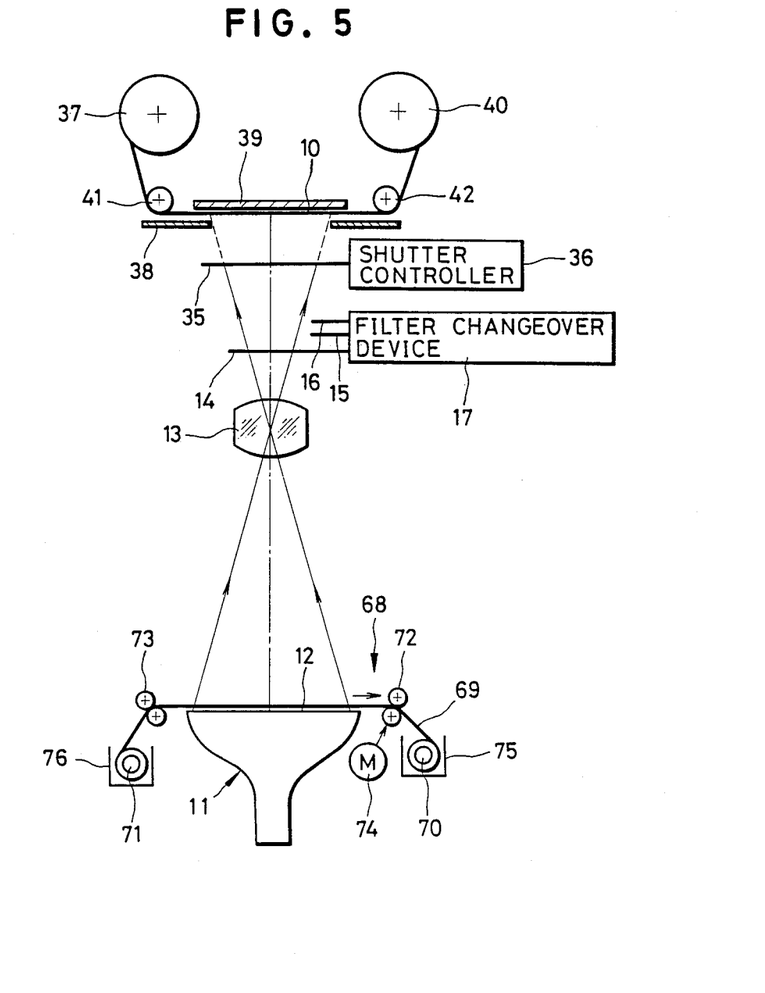
FIG. 5 is a schematic illustration, similar to FIG. 1, of the CRT printing apparatus of another embodiment of the present invention.

Referring now to FIG. 5, shown therein is another embodiment of the present invention which is much the same in construction and operation as that shown in FIG. 1, except that there is provided a ribbon type letter display unit 68 in place of the letter display unit 20 of FIG. 1, and no monitor screen 47. The ribbon type letter display unit 68, which comprises a letter bearing ribbon 62 and transporting means, is put on the CRT 11 in such a way that the letter bearing ribbon 69 is positioned in contact with or close to the CRT screen 12. The transporting means comprises a pair of reels 70 and 71 which are installed in interchangeable magazines 75 and 76 respectively, disposed on the both sides of the CRT 11, and two pairs of rollers 72 and 73 one of which is driven by a motor 74. The letter bearing ribbon 69 is connected at both ends to the respective reels 70 and 71 so as to be movable in the both directions. It is permissible to use an endless letter bearing ribbon movable in one direction.

Figure 6:
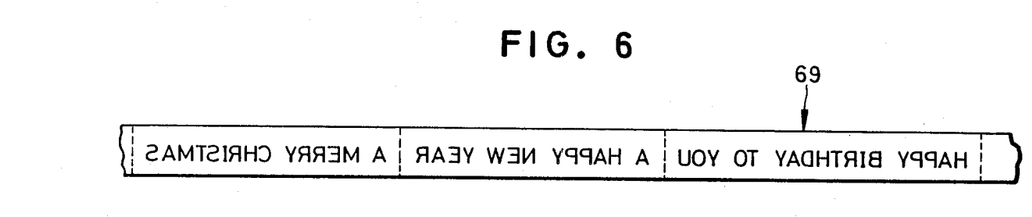
FIG. 6 is a schematic illustration showing partially a letter bearing ribbon.

In FIG. 6 partially showing the letter bearing ribbon 69, printed thereon are season's greeting or complimentary phrases such as "A HAPPY NEW YEAR", "A MERRY CHRISTMAS", "HAPPY BIRTHDAY TO YOU" and so on. The letter bearing ribbon 69 is moved in a desired direction such as to place one of the complimentary phrases in a desired position on the CRT screen 12. The letter bearing ribbon 69 can be easily prepared by printing letter originals on a lithographic negative film at regular intervals. When printing an original with black letters on a white back ground, on the lithographic negative film are transparent letters on a dart back ground. On the other hand, when using an original with whitish letters on a dark back ground letters are provided on a transparent back ground. If colored letters should be printed on the color photographic paper 10, the letter bearing ribbon 69 with transparent letters on a dark background is used. In this case, the color photographic paper 10 is exposed to the letter bearing ribbon 69 with an illumination light whose three color components are properly regulated. The letter bearing ribbon 69 may be made of, in place of the lithographic negative film, a transparent plastic strip with letters printed thereon, an opaque plastic strip with transparent letters on a dark back ground, or a transparent tape with a plurality of lettered plates arranged at regular intervals thereon. It is desirable to locate or provide complimentary phrases of the same season or of the same usage on a single letter bearing ribbon.

Figure 7:
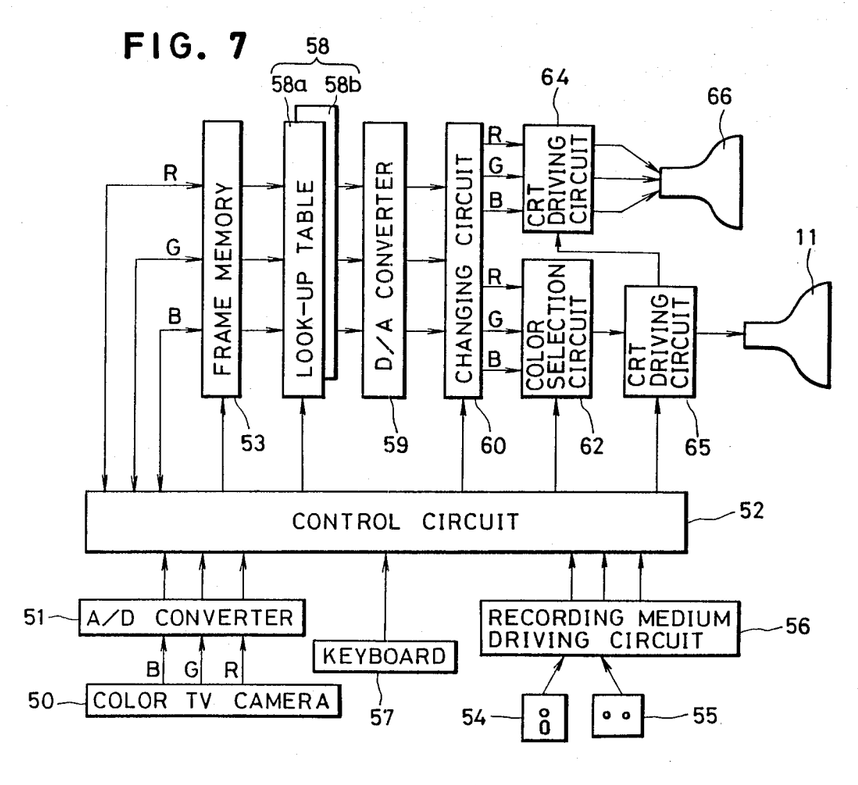
FIG. 7 is a block diagram showing a CRT control circuit used in connection with the CRT printing apparatus of FIG. 5.

FIG. 7 shows a control circuit for use with the CRT image printing apparatus of FIG. 5 which is much similar in construction and function to the control circuit of FIG. 3. A constructional distinction from the control circuit of FIG. 3 is the provision of a color CRT display unit (which is referred to as a color CRT) 66 for a monitoring purpose. Therefore, the following description will be directed only to the distinctive part of the control circuit.

The image signals stored in the frame memory 53 are retrieved upon monitoring or printing an image to be printed and transmitted to a look-up table 58 comprising a monitoring look-up table 58a and a printing look-up table 58b. The image signals are corrected in gradation in accordance with the characteristics of the color CRT 66 in the look-up table memory 58a, reversed from positive to negative, and corrected in gradation in accordance with the characteristic of the color photographic paper 10 in the look-up table memory 58b. The positive image signals thus corrected in the look-up table memory 58a are, after having been converted into analog signals, transmitted through the changing circuit 60 to a CRT driving circuit 64 of the color monitor CRT 66 so as to display the color image on the screen of the color monitor CRT 66 for eye inspection. When actually printing, the negative image signals from the look-up table memory 58b are transmitted through the changing circuit 60 to the selection circuit 62. The selection circuit sequentially supplies the negative image signals by color to the CRT driving circuit 65 so as to display the black-and-white images of the three monochromatic negative images in the form of brightness patterns in sequence.

Figure 8:
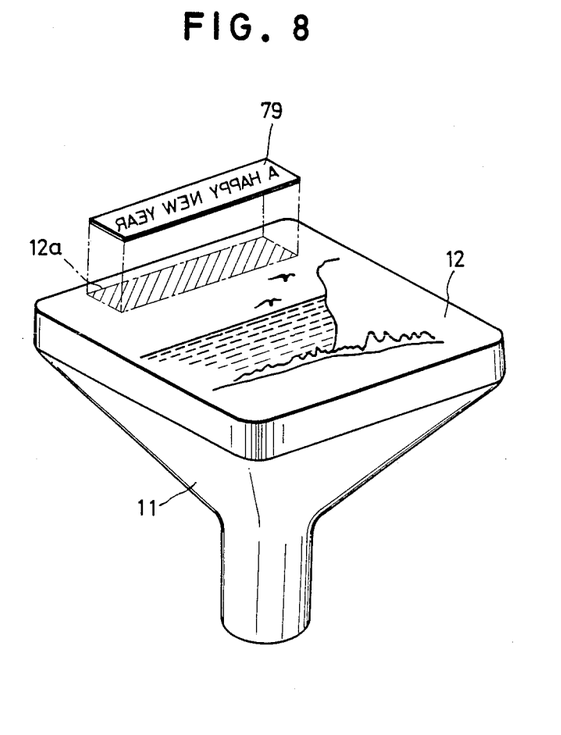
FIG. 8 is a schematic illustration showing a lettered plate.

FIG. 8 shows a simplified lettered plate 79 which is made by printing a letter original on a lithographic negative film in the same manner as described with regard to the letter bearing ribbon 69 of FIG. 6. Alternatively, the lettered plate 79 may be made of either transparent of opaque plastic plate with letters. The lettered plate 79 can be placed at any desired position on the screen 12 of the CRT 11. Instructions are entered through the keyboard 57 so as to indicate a particular space of the frame memory 53 which corresponds to the space 12a of the CRT screen 12 where the lettered plate 79 is placed thereon, such that the system can replace image signals previously stored in memory cells of the space of the frame memory 53 with illumination data.

In the above described embodiment the CRT image and the complimentary phrase are compositely displayed on the screen of the color CRT 66 of FIG. 7 for eye inspection. The same image as displayed on the screen of the color CRT 66 is printed on the color photographic paper 10 in the same manner as described previously with regard to the above embodiments.

Figure 9:
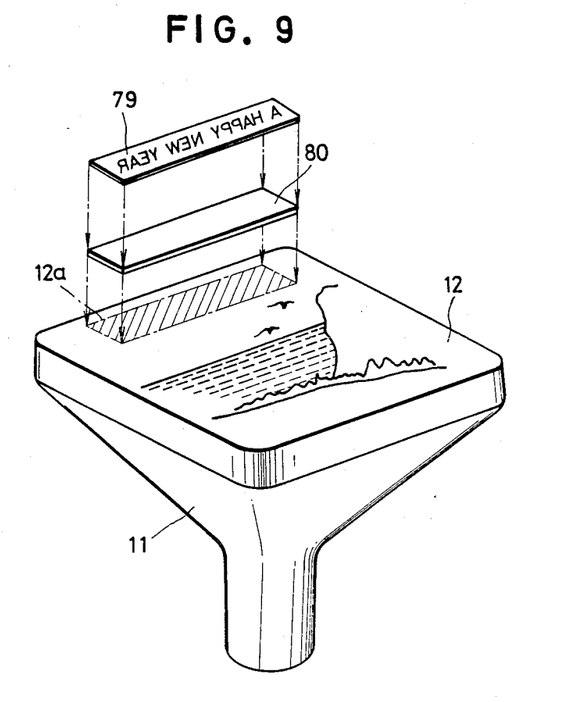
FIG. 9 is a schematic illustration of the lettered plate of FIG. 8 used with a diffusion plate.

FIG. 9 shows still another embodiment wherein the same lettered plate 79 as shown in FIG. 8 is used. The lettered plate 79 is placed on the screen 12 of the CRT 11 with a diffusing plate 80 being provided therebetween. Although the letter is printed simultaneously with the CRT image the printed letter is not overlapped with any transverse bright line resulting from rasters appearing on the CRT screen.

It is of course permissible to physically or electrically mask part of the CRT image where the lettered plate 79 is laid on so as not to illuminate to the lettered plate 79, in order to print the letter separately from the CRT image.

Figure 10:
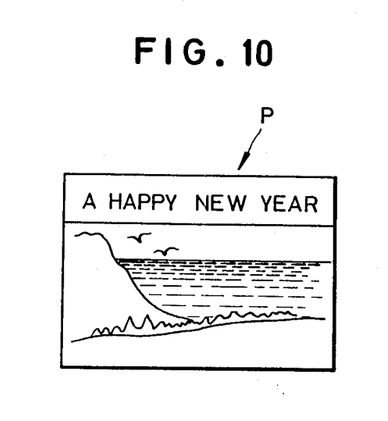
FIG. 10 is an illustration showing a completed print of an image with a season's complimentary phrase.

FIG. 10 is an example of the completed print P in which the complimentary phrase is printed in a horizontal orientation at the top thereof. This print can be obtained using any embodiment of the present invention.

Although the present invention has been fully described by way of the preferred embodiments thereof with reference to the accompanying drawings, it is to be noted that various changes and modifications are apparent to those skilled in the art. Therefore, unless such changes and modifications otherwise depart from the true scope of the present invention they should be construed as being included therein.

What is claimed is:

1. An apparatus for printing compositely an image and letters on a photographic paper, which comprises:
    display means having a CRT display device for displaying said image on the screen thereof;
    letter bearing means provided with at least a complimentary phrase thereon which is removably disposed at least close to said screen;
    adjusting means for linearly and rotationally adjusting said letter bearing means such that said complimentary phrase can be positioned at substantially any desired location with respect to said screen; and
    means for exposing said photographic paper to said CRT image on said screen and said complimentary phrase on said letter bearing means.

2. An apparatus as defined in claim 1, wherein said letter bearing means is disposed on said screen through a diffusion plate.

3. An apparatus as defined in claim 1, wherein said CRT display means includes an image memory wherein image data of said CRT image stored therein can be partially replaced with illumination data so as to erase part of said CRT image on an area of said screen where said letter bearing means is disposed, and to cause said area to emit illumination light for said letter bearing means.

4. An apparatus as defined in claim 1, which further comprises a carrier means removably attached to said letter bearing means, said carrier being supported on means adapted to move rectinlinearly and turn said carrier, thereby to change said letter bearing means to a desired position on said screen.

5. An apparatus as defined in claim 1, wherein said letter bearing means is of a lithographic negative film.

6. An apparatus as defined in claim 1, wherein said letter bearing means is a ribbon with a plurality of complimentary phrases provide thereon at regular intervals which is moved longitudinally to select any one of said complimentary phrases on said screen.

7. An apparatus for printing compositely an image and letters on a color photographic paper, which comprises:
    image display means having an image memory storing data of said image and a black-and-white CRT display device for displaying said image data as black-and-white images in the form of a brightness pattern for blue, green and red component images of said image sequentially on the screen of said CRT display device;
    letter bearing means provided with at least a complimentary phrase thereon, which is removable disposed at least close to said screen;
    color filters of blue, green and red which are selectively placed between said color photographic paper and CRT display device; and
    means for exposing said color photographic paper to said black-and-white images and complimentary phrase through said corresponding color filters in multiple exposure.

8. An apparatus as defined in claim 7, wherein said letter bearing means is disposed on said screen through a diffusion plate.

9. An apparatus as defined in claim 7, wherein said image data in said image memory can be partially replaced with illumination data so as to erase part of said black-and-white images on an area of said screen wherein said letter bearing means is disposed and to cause said area to emit illumination light for said letter bearing means.

10. An apparatus as defined in claim 7, wherein said illumination data includes data of the three primary color components of illumination light suitable for a color with which said complimentary phrase is printed.

11. An apparatus as defined in claim 7, which further comprises a carrier means removable attached to said letter bearing means, said carrier being supported on means adapted to move rectilinearly and turn said carrier, thereby to change said letter bearing means to a desired position on said screen.

12. An apparatus as defined in claim 7, wherein said letter bearing means is of a lithographic negative film.

13. An apparatus as defined in claim 7, wherein said letter bearing means is a ribbon with a plurality of complimentary phrases provided thereon at regular intervals which is moved longitudinally to select any one of said complimentary phrases on said screen.

14. A method for printing compositely an image and letters on a photographic paper, which comprises the steps:
    storing data of said image in an image memory;
    displaying said image data as a CRT image on a screen of a CRT display device;
    disposing a complimentary phrase provided on letter bearing means at least close to the surface of said screen;
    linearly and rotationally adjusting said letter bearing means such that complimentary phrase is positioned at a desired location with respect to said screen, said complimentary phrase being adjustable so as to be positionable at substantially any desired location with respect to said screen; and
    exposing said photographic paper to said CRT image and complimentary phrase.

15. A method as defined in claim 14, wherein said disposing step is accomplished using a letter bearing means disposed on said screen through a diffusion plate.

16. A method as defined in claim 14, which further comprises the steps of partially replacing said image data in said image memory with illumination data so as to erase part of said CRT image on an area of said screen where said letter bearing means is disposed and to cause said area to emit illumination light for said letter bearing means.

17. A method as defined in claim 14, wherein said illumination data includes data of blue, green and red components of illumination light suitable for a color with which said complimentary phrase is printed.

18. A method for printing compositely an image and letters on a color photographic paper using a black-and-white CRT display device, which comprises the steps of:
    storing data of said image in an image memory:
    retrieving said image data and displaying said retrieved image data as black-and-white images in the form of a brightness pattern for blue, green and red component images of said image on the screen of said black-and-white CRT display device in sequence;
    disposing a complimentary phrase provided on letter bearing means at least close to the surface of said screen; and
    exposing said color photographic paper to said black-and-white images and complimentary phrase through blue, green and red color filters in multiple exposure.

19. An apparatus as defined in claim 18, wherein said letter bearing means is disposed on said screen through a diffusion plate.

20. A method as defined in claim 18, which further comprises the step of partially replacing said image data in said image memory with illumination data so as to erase part of said black-and-white images on an area of said screen where said letter bearing means is disposed and to cause said area to emit illumination light for said letter bearing means.

21. A method as defined in claim 18, wherein said illumination data includes data of blue, green and red components of illumination light suitable for a color with which said complimentary phrase is printed.

* * * * *